United States Patent

Mahalingaiah et al.

[11] Patent Number: 5,870,578
[45] Date of Patent: Feb. 9, 1999

[54] WORKLOAD BALANCING IN A MICROPROCESSOR FOR REDUCED INSTRUCTION DISPATCH STALLING

[75] Inventors: Rupaka Mahalingaiah; Thomas S. Green, both of Austin, Tex.

[73] Assignee: Advanced Micro Devices, Inc., Sunnyvale, Calif.

[21] Appl. No.: 987,451

[22] Filed: Dec. 9, 1997

[51] Int. Cl.$^6$ .................................................. G06F 9/30
[52] U.S. Cl. ..................... 395/391; 395/386; 395/388; 395/800.23; 395/800.26
[58] Field of Search .................................. 395/386, 388, 395/389, 391, 800.23, 800.26

[56] References Cited

U.S. PATENT DOCUMENTS

| | | |
|---|---|---|
| 4,044,338 | 8/1977 | Wolf . |
| 4,453,212 | 6/1984 | Gaither et al. . |
| 4,807,115 | 2/1989 | Torng . |
| 4,858,105 | 8/1989 | Kuriyama et al. . |
| 4,928,223 | 5/1990 | Dao et al. . |
| 5,053,631 | 10/1991 | Perlman et al. . |
| 5,058,048 | 10/1991 | Gupta et al. . |
| 5,129,067 | 7/1992 | Johnson . |
| 5,136,697 | 8/1992 | Johnson . |
| 5,226,126 | 7/1993 | McFarland et al. . |
| 5,226,130 | 7/1993 | Favor et al. . |
| 5,371,864 | 12/1994 | Chuang ................................. 395/382 |
| 5,377,339 | 12/1994 | Saito et al. ............................ 395/391 |
| 5,613,080 | 3/1997 | Ray et al. .............................. 395/390 |
| 5,627,982 | 5/1997 | Hirata et al. .......................... 395/382 |
| 5,649,138 | 7/1997 | Ireton . |
| 5,651,125 | 7/1997 | Witt et al. . |
| 5,748,978 | 5/1998 | Narayan et al. .................. 395/800.23 |
| 5,751,981 | 5/1998 | Witt et al. ............................. 395/380 |
| 5,758,114 | 5/1998 | Johnson et al. ...................... 395/380 |

FOREIGN PATENT DOCUMENTS

| | | |
|---|---|---|
| 0 259 095 | 3/1988 | European Pat. Off. . |
| 0 381 471 | 8/1990 | European Pat. Off. . |
| 0 459 232 | 12/1991 | European Pat. Off. . |
| 0 649 085 A | 4/1995 | European Pat. Off. . |
| 2263985 | 8/1993 | United Kingdom . |
| 2263987 | 8/1993 | United Kingdom . |
| 2281422 | 3/1995 | United Kingdom . |

OTHER PUBLICATIONS

Intel, "Chapter 2: Microprocessor Architecture Overview," 1994, pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes On Intel P6," BYTE, Jan. 1996, 4 pages.

(List continued on next page.)

*Primary Examiner*—Krisna Lim
*Attorney, Agent, or Firm*—Conley, Rose & Tayon; B. Noel Kivlin; Lawrence J. Merkel

[57] ABSTRACT

A microprocessor employs a set of symmetrical functional units, each of which is coupled into an issue position. Instructions are fetched and aligned to the issue positions. During clock cycles in which fewer than the maximum number of instructions are concurrently selected for dispatch to the issue positions, the microprocessor distributes the selected instructions among the issue positions in order to substantially equalize the number of instructions conveyed to each issue position over a number of clock cycles. For example, the microprocessor may employ a counter, each value of which indicates a different set of issue positions to which instruction(s) are to be distributed. The counter is incremented each time the value is used to select a distribution. The resources in each issue position may be used more efficiently due to the more even distribution of instructions among the issue positions.

31 Claims, 9 Drawing Sheets

OTHER PUBLICATIONS

*"Intel Architecture Software Developer's Manual, vol. 1: Basic Architecture"*, Intel Corporation, Prospect IL, 1996, 1997, Chapter 8: Programming With The Intel MMX™ Technology, pp. 8–1 through 8–15.

Holstad, S., "Tutorial Tuesday: Decoding MMX" Jan. 14, 1997, Earthlink Network, Inc. copyright 1997, 5 pages (see http://www.earthlink.net/daily/Tuesday/MMX).

"Intel MMX™ Technology —Frequently Asked Questions" 6 pages (see http://www.intel.com/drg/mmx/support/faq/htm).

| Number Selected | Counter Value | Issue Positions | | |
|---|---|---|---|---|
| | | 0 | 1 | 2 |
| 0 | x | none | none | none |
| 1 (IS0) | 0 | IS0 | none | none |
| 1 (IS0) | 1 | none | IS0 | none |
| 1 (IS0) | 2 | none | none | IS0 |
| 2 (IS0,IS1) | 0 | IS0 | IS1 | none |
| 2 (IS0,IS1) | 1 | none | IS0 | IS1 |
| 2 (IS0,IS1) | 2 | IS0 | none | IS1 |
| 3 (IS0,IS1,IS2) | x | IS0 | IS1 | IS2 |

| Valid 132 | Start Ptr 134 | End Ptr 136 | Valid Mask 138 | MROM/Fast Path 140 | Branch Prediction 142 |

| Address Bits 150 | Functional Bits 152 | Segment Limit 154 | Overflow 156 | Instruction Bytes 158 |

WORKLOAD BALANCING IN A MICROPROCESSOR FOR REDUCED INSTRUCTION DISPATCH STALLING

BACKGROUND OF THE INVENTION

1. Field of the Invention

This invention is related to the field of microprocessors and, more particularly, to the alignment of instructions to issue positions within microprocessors.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Microprocessor designers often design their products in accordance with the x86 microprocessor architecture in order to take advantage of its widespread acceptance in the computer industry. Because the x86 microprocessor architecture is pervasive, many computer programs are written in accordance with the architecture. X86 compatible microprocessors may execute these computer programs, thereby becoming more attractive to computer system designers who desire x86-capable computer systems. Such computer systems are often well received within the industry due to the wide range of available computer programs.

The x86 architecture specifies a variable length instruction set (i.e. an instruction set in which various instructions employ differing numbers of bytes to specify that instruction). For example, the 80386 and later versions of x86 microprocessors employ between 1 and 15 bytes to specify a particular instruction. Instructions have an opcode, which may be 1–2 bytes, and additional bytes may be added to specify addressing modes, operands, and additional details regarding the instruction to be executed.

Unfortunately, having variable length instructions creates numerous problems for dispatching multiple instructions per clock cycle. Because the instructions have differing numbers of bytes, an instruction may begin at any memory address. Conversely, fixed length instructions typically begin at a known location. For example, a 4 byte fixed length instruction set has instructions which begin at 4 byte boundaries within memory (i.e. the two least significant bits are zeros for the memory addresses at which instructions begin).

In order to locate multiple variable length instructions during a clock cycle, instruction bytes fetched by the microprocessor may be serially scanned to determine instruction boundaries and thereby locate instructions which may be concurrently dispatched. Serial scanning involves a large amount of logic, and typically a large number of cascaded logic levels. For high frequency (i.e. short clock cycle time) microprocessors, large numbers of cascaded logic levels may be deleterious to the performance of the microprocessor.

Some microprocessor designs employ predecoding to identify the beginning and end of instructions as the instructions are stored into an instruction cache within the microprocessor. Even with predecoding, locating and dispatching multiple instructions per clock cycle is a complex and often clock-cycle-limiting operation. This process is even further exacerbated by the need to identify the type of instruction, in order to select an appropriate functional unit to which the instruction should be dispatched. Often, different functional units are designed to execute different types of instructions (i.e. different subsets of the instruction set). Once multiple instructions are detected and the types determined, which of the instructions may be dispatched is determined by selecting the first instructions of various types to be conveyed to corresponding functional units.

A method for simplifying the instruction selection process is to provide symmetrical functional units (i.e. functional units configured to execute the same subset of instructions). In this manner, instruction type determinations are not needed, since each functional unit executes the same subset of instructions. Such a solution may then select the first-identified instruction (in program order) to be dispatched to the first functional unit, the second-identified instruction (in program order) to be dispatched to the second functional unit, etc. Unfortunately, a selection method as described may lead to an imbalance in the number of instructions dispatched to each functional unit. Due to various restrictions (e.g. dispatch rules to simplify the hardware within the microprocessor, misses in the cache, or the lack of a sufficient number of instructions within the instruction bytes available for scanning, etc.) the number of instructions identified for dispatch during a clock cycle may be less than a maximum number of concurrently dispatchable instructions. The maximum number of concurrently dispatchable instructions may be related to the number of functional units (e.g. one instruction per functional unit), or may be determined by the number of instructions which can be identified concurrently within a certain clock frequency goal, etc. If, for example, one instruction is identified, the instruction may be dispatch to the first functional unit while no instructions are dispatched to other functional units. The first functional unit's resources (e.g. reservation stations, etc.) may then tend to fill more quickly than other functional unit's resources. Even though other functional units may have available resources, the lack of resources in the first functional unit may cause undesirable stalls in the dispatch of instructions.

SUMMARY OF THE INVENTION

The problems outlined above are in large part solved by a microprocessor in accordance with the present invention. The microprocessor employs a set of symmetrical functional units, each of which is coupled into an issue position. Instructions are fetched and aligned to the issue positions. During clock cycles in which fewer than the maximum number of instructions are concurrently selected for dispatch to the issue positions, the microprocessor distributes the selected instructions among the issue positions in order to substantially equalize the number of instructions conveyed to each issue position over a number of clock cycles. For example, the microprocessor may employ a counter, each value of which indicates a different set of issue positions to which instruction(s) are to be distributed. The counter is incremented each time the value is used to select a distribution. Advantageously, the issue positions may include similar resources and yet still be less prone to stall due to a lack of available resources in a particular issue position. In other words, the resources in each issue position may be used more efficiently due to the more even distribution of instructions among the issue positions. Since the resources are used more efficiently, performance may be increased using the same amount of resources.

Broadly speaking, the present invention contemplates an instruction alignment unit comprising an instruction selection unit and a workload balance unit. The instruction selection unit is configured to receive a plurality of instruction identifiers which locate instructions within a plurality of instruction bytes. Additionally, the instruction selection unit is configured to select up to a maximum number of instructions for dispatch during a clock cycle responsive to the plurality of instruction identifiers. The instruction selection unit is configured to assign each selected instruction to a preliminary one of a plurality of issue positions responsive to a program order of the selected instructions. Coupled to the instruction selection unit, the workload balance unit is configured to reassign each selected instruction from the preliminary one of the plurality of issue positions to a final one of the plurality of issue positions responsive to a number of the selected instructions being less than the maximum number of instructions.

The present invention further contemplates a method for aligning instructions to a plurality of issue positions. Up to a maximum number of instructions are identified for dispatch during a clock cycle. If less than the maximum number of instructions are identified, instructions are distributed to the plurality of issue positions using a distribution which substantially equalizes a number of instructions conveyed to each of the plurality of issue positions over a plurality of clock cycles.

Still further, the present invention contemplates a microprocessor comprising a plurality of issue positions and an instruction alignment unit. An instruction provided to one of the plurality of issue positions is decoded by a decode unit comprising that one of the plurality of issue positions and is executed by a functional unit comprising that one of the plurality of issue positions. The instruction alignment unit is configured to select an instruction for each of the plurality of issue positions, and, if fewer instructions are selected during a clock cycle than a number of the plurality of issue positions, the instruction alignment unit is configured to distribute the instructions to the plurality of issue positions to substantially equalize a number of instructions dispatched to each one of the plurality of issue positions during a number of clock cycles.

BRIEF DESCRIPTION OF THE DRAWINGS

Other objects and advantages of the invention will become apparent upon reading the following detailed description and upon reference to the accompanying drawings in which:

FIG. 6 is a truth table illustrating operation of one embodiment of the workload balance unit shown in FIGS. 4 and 5.

Figure 1:
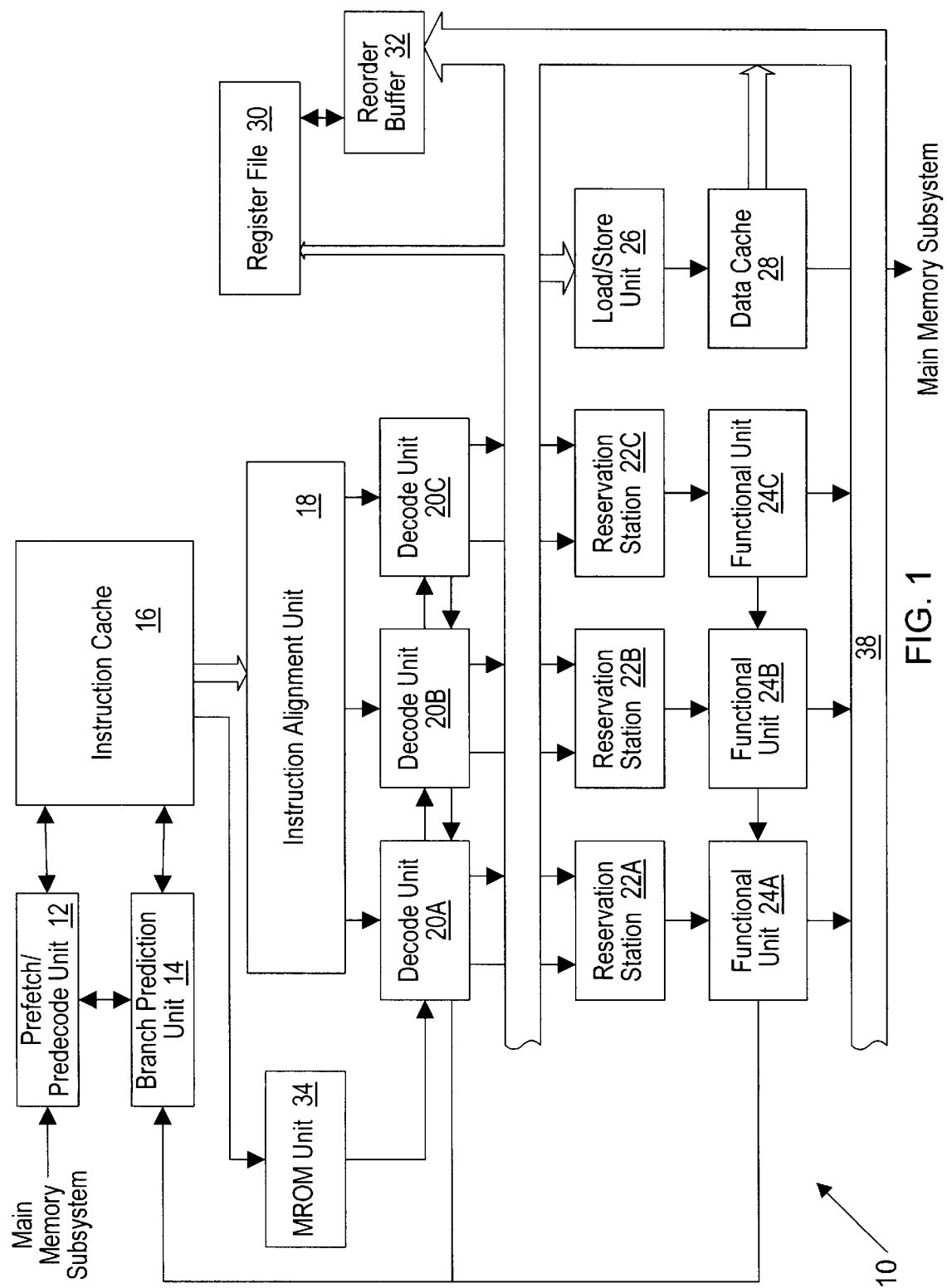
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Other embodiments are possible and contemplated. As shown in FIG. 1, microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a register file 30, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to the main memory subsystem. Finally, MROM unit 34 is coupled to decode units 20.

Generally speaking, instruction alignment unit 18 is configured to receive instruction blocks from instruction cache 16 and to align instructions from the instruction blocks to decode units 20. Each decode unit 20A–20C is coupled to a respective functional unit 24A–24C. Functional units 24A–24C are symmetrical functional units, according to the present embodiment. Instruction alignment unit 18 employs a byte queue for storing the instruction blocks, and scans the instruction blocks stored in the byte queue to select up to a maximum number of concurrently dispatchable instructions. Instructions are selected according to predetermined dispatch criteria. The dispatch criteria are determined by the hardware within microprocessor 10. For example, at most one MROM instruction may be concurrently selected for dispatch. Once an instruction which cannot be concurrently dispatched with previous instructions is detected, no more instructions are selected for dispatch. Therefore, fewer than the maximum number of concurrently dispatchable instructions may be selected. Additionally, fewer than the maximum number of concurrently dispatchable instructions may be selected if fewer than that number are stored in the byte queue.

Instruction alignment unit 18 arranges instruction identifiers corresponding to the selected instructions into a set of preliminary issue positions, filling the first issue position with the first instruction in program order, the second issue position with the second instruction in program order, etc. Instruction alignment unit 18 is configured, if less than the maximum number of concurrently dispatchable instructions is selected, to rearrange the issue positions to achieve greater distribution of instructions among the issue positions. In one embodiment, instruction alignment unit 18 maintains the program order of the instructions (i.e. the instruction dispatched to the first issue position, if any, is prior to the instruction dispatched to the second issue position, if any, etc.). However, the first issue position may receive no instruction while the second and third issue positions may receive instructions. Advantageously, instructions may be more evenly distributed among the issue positions. Equal resources may be configured into each issue position, and stalls due to one issue position receiving more instructions than another may be less frequent due to the more even distribution of instructions. Performance of microprocessor 10 may thereby be increased due to reduced stalling. It is noted that, although the present embodiment includes three issue positions, other embodiments may include any number of issue positions. The issue positions in the present embodiment correspond to a set of symmetrical functional units 24A–24C, thereby allowing reassignment of instructions to different issue positions based upon the number of instructions selected, without regard to the types of the selected instructions.

An instruction block, as used herein, comprises a fixed number of bytes within which up to a maximum number of instructions per block are identified. A particular instruction block may include fewer instructions than the maximum number of instructions per block within its fixed number of bytes. Alternatively, a given fixed number of bytes within instruction cache 16 may include more instructions than the maximum number of instructions per block. In the latter case, two or more instruction blocks are formed from the given fixed number of bytes. Each instruction block includes the fixed number of bytes but identifies different instructions within the fixed number of bytes as comprising the instruction block. The fixed number of bytes are aligned to a boundary of the fixed number of bytes. In one embodiment, instruction blocks comprise eight bytes aligned on an eight byte boundary and the maximum number of instructions per block is three. The maximum number of instructions per block is selected because the average length of an x86 instruction is three bytes. Therefore, each eight bytes of instruction code includes 2⅔ instructions on average. It is noted that the maximum number of instructions per block may be varied in various embodiments as a matter of design choice.

Instruction cache 16 is a high speed cache memory provided to store instructions. Instructions are fetched from instruction cache 16 and dispatched to decode units 20. In one embodiment, instruction cache 16 is configured to store up to 64 kilobytes of instructions in a 4 way set associative structure having 32 byte lines (a byte comprises 8 binary bits). Alternatively, 2 way set associativity may be employed as well as any other desired associativity. Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to the request thereof from instruction cache 16 in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing a variable byte length instruction set will next be described. A variable byte length instruction set is an instruction set in which different instructions may occupy differing numbers of bytes. An exemplary variable byte length instruction set employed by one embodiment of microprocessor 10 is the x86 instruction set.

In the exemplary encoding, if a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an immediate byte would have start, end, and functional bits as follows:

| | |
|---|---|
| Start bits | 10000 |
| End bits | 00001 |
| Functional bits | 11000 |

According to one particular embodiment, early identification of an instruction that includes a scale-index-base (SIB) byte is advantageous for MROM unit 34. For such an embodiment, if an instruction includes at least two bytes after the opcode byte, the functional bit for the Mod R/M byte indicates the presence of an SIB byte. If the functional bit for the Mod R/M byte is set, then an SIB byte is present. Alternatively, if the functional bit for the Mod R/M byte is clear, then an SIB byte is not present.

MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each 16 byte portion of each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per 16 byte portion of the cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes. The selected instructions are then merged to a set of issue positions corresponding to decode units 20, such that the issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer before they are written to register file 30. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exceptioncausing instruction, in which case the speculative results may be discarded by reorder buffer 32.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of Fig. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C. Generally, an "issue position" refers to hardware to which an instruction may be dispatched. Once the instruction is dispatched to an issue position, the instruction remains within the issue position until an execution result corresponding to the instruction is generated and provided by the issue position to reorder buffer 32.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of microprocessor 10 which employ the x86 microprocessor architecture, register file 30 comprises storage locations for each of the 32 bit real registers. Additional storage locations may be included within register file 30 for use by MROM unit 34. Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. If following decode of a given instruction it is determined that reorder buffer 32 has a previous location or locations assigned to a register used as an operand in the given instruction, the reorder buffer 32 forwards to the corresponding reservation station either: 1) the value in the most recently assigned location, or 2) a tag for the most recently assigned location if the value has not yet been produced by the functional unit that will eventually execute the previous instruction. If reorder buffer 32 has a location reserved for a given register, the operand value (or reorder buffer tag) is provided from reorder buffer 32 rather than from register file 30. If there is no location reserved for a required register in reorder buffer 32, the value is taken directly from register file 30. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are stored into register file 30 simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that storing instruction results into register file 30 and freeing the corresponding storage is referred to as "retiring" the instructions. It is further noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26. For the present embodiment, functional units 24 are symmetrical functional units. In one particular embodiment, each functional unit 24 may comprise an address generation unit for generating addresses and an execute unit for performing the remaining functions. The two units may operate independently upon different instructions during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26.

Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
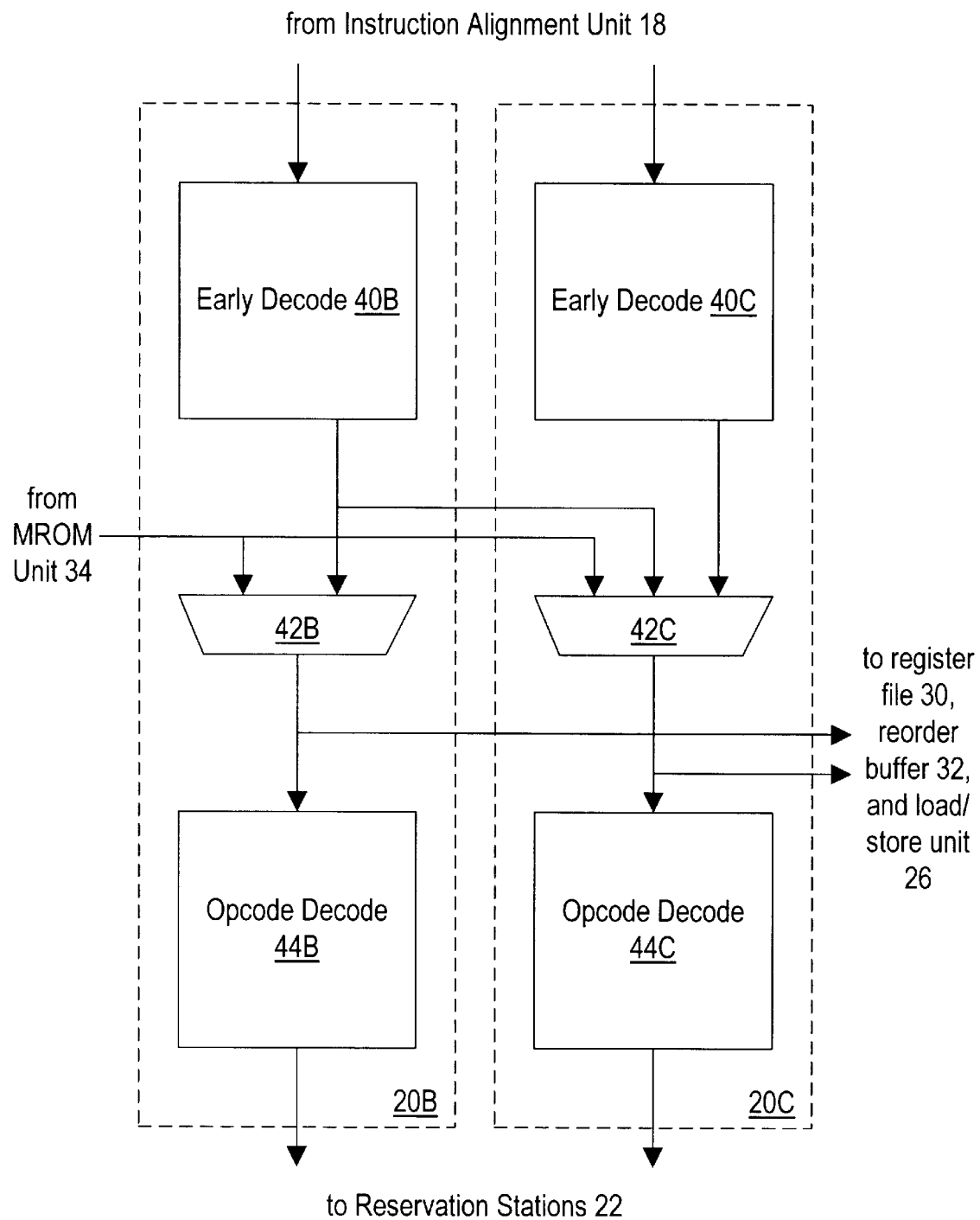
FIG. 2 is a block diagram of one embodiment of a pair of decode units shown in FIG. 1.

Turning now to FIG. 2, a block diagram of one embodiment of decode units 20B and 20C is shown. Other embodiments are possible and contemplated. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexor 42B is included for selecting between the instructions provided by MROM unit 34 and by early decode unit 40B. During times in which MROM unit 34 is dispatching instructions, multiplexor 42B selects instructions provided by MROM unit 34. At other times, multiplexor 42B selects instructions provided by early decode unit 40B. Similarly, multiplexor 42C selects between instructions provided by MROM unit 34, early decode unit 40B, and early decode unit 40C. The instruction from MROM unit 34 is selected during times in which MROM unit 34 is dispatching instructions. During times in which the early decode unit within decode unit 20A (not shown) detects a double dispatch instruction, the instruction from early decode unit 40B is selected by multiplexor 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;
(ii) decode unconditional branch instructions (which may include the unconditional jump, the CALL, and the RETURN) which were not detected during branch prediction;
(iii) decode source and destination flags;
(iv) decode the source and destination operands which are register operands and generate operand size information; and
(v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to register file 30 and reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
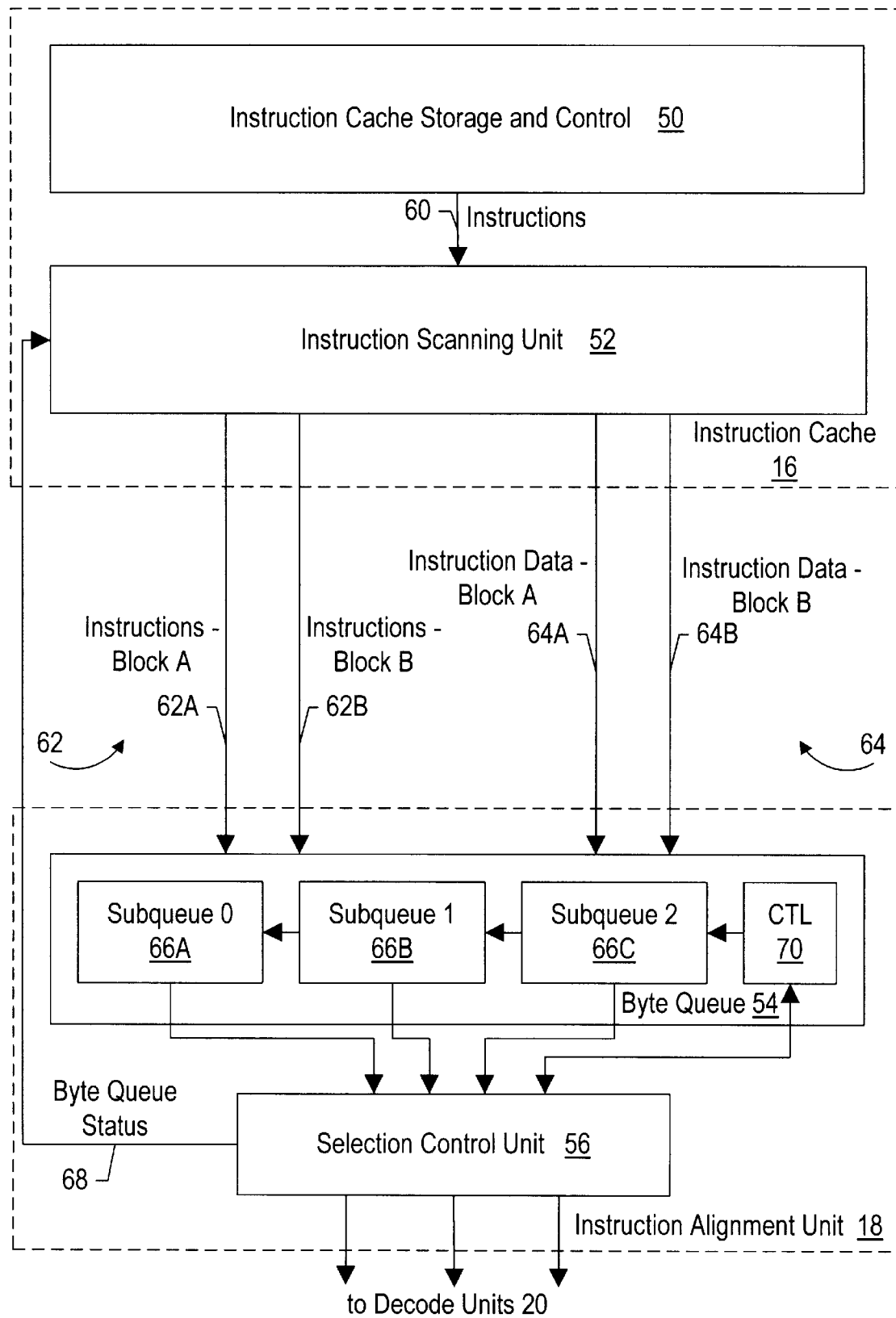
FIG. 3 is a block diagram of one embodiment of an instruction cache and one embodiment of an instruction alignment unit shown in greater detail.

Turning now to FIG. 3, a block diagram of one embodiment of instruction cache 16 and instruction alignment unit 18 are shown. Other embodiments are possible and contemplated. As shown in FIG. 3, instruction cache 16 includes an instruction cache storage and control block 50 and an instruction scanning unit 52. Instruction alignment unit 18 includes a byte queue 54 and a selection control unit 56.

Instruction cache storage and control block 50 includes storage for instruction cache lines and related control circuitry for fetching instructions from the storage, for selecting cache lines to discard when a cache miss is detected, etc. Instruction cache storage and control block 50 receives fetch addresses from branch prediction unit 14 (shown in FIG. 1) in order to fetch instructions for execution by microprocessor 10. Instruction bytes fetched from instruction cache storage and control block 50 are conveyed to instruction scanning unit 52 upon an instructions bus 60. Instruction bytes are conveyed upon instructions bus 60, as well as corresponding predecode data (e.g. start, end, and functional bits). In one embodiment, sixteen bytes stored in contiguous memory locations are conveyed upon instructions bus 60 along with the corresponding predecode data. The sixteen bytes form either the upper or lower half of the 32 byte cache line employed by instruction cache 16 according to the present embodiment. The upper half of the cache line is the half stored in memory addresses having larger numerical values, while the lower half is stored in memory addresses having smaller numerical values. Additionally, instruction scanning unit 52 receives information regarding the bytes within the sixteen bytes which are to be conveyed as instructions to instruction alignment unit 18. Instruction bytes at the beginning of the sixteen bytes may be ignored if the bytes are fetched as the target of a branch instruction, and the target address identifies a byte other than the first byte of the sixteen bytes. Additionally, if a branch instruction is within the sixteen bytes and branch prediction unit 14 predicts the branch taken, then bytes subsequent to the branch instruction within the sixteen bytes are ignored.

Instruction scanning unit 52 scans the predecode data associated with the bytes which are to be conveyed as instructions to instruction alignment unit 18. Instruction scanning unit 52 divides the sixteen bytes conveyed by instruction cache storage and control block 50 into two portions comprising eight contiguous bytes each. One portion forms the lower half of the sixteen bytes (i.e. the bytes stored at smaller numerical addresses than the bytes forming the upper half of the sixteen bytes). The other portion forms the upper half of the sixteen bytes. Therefore, an eight byte portion forms one of four quarters of the 32 byte cache line employed by instruction cache storage and control block 50, according to the present embodiment. As used herein, bytes are contiguous if they are stored in contiguous memory locations in the main memory subsystem. It is noted that particular sizes of various components (e.g. instruction blocks, cache lines, etc.) are used herein for clarity of the description. Any size may be used for each component within the spirit and scope of the appended claims.

Instruction scanning unit 52 scans the predecode data of each portion of the instruction bytes independently and in parallel. These portions scanned by scanning unit 52 comprise the fixed number of bytes defined to be an instruction block. Instruction scanning unit 52 therefore scans the predecode data to identify up to the maximum number of instructions per block.

The instruction bytes and instruction identifiers generated by instruction scanning unit 52 are conveyed to byte queue 54 upon an instructions bus 62 and an instruction data bus 64, respectively. As shown in FIG. 3, instructions bus 62 includes an instructions—block A bus 62A and an instructions—block B bus 62B. Instructions—block A bus 62A conveys the instruction bytes corresponding to the first instruction block being scanned by instruction scanning unit 52 (in program order). Similarly, instructions—block B bus 62B conveys the instruction bytes corresponding to the second instruction block being scanned by instruction scanning unit 52.

Instruction identifiers corresponding to the instruction bytes conveyed upon instructions—block A bus 62A is conveyed upon instruction data—block A bus 64A. Similarly, instruction identifiers corresponding to the instruction bytes conveyed upon instructions—block B bus 62B is conveyed upon instruction data—block B bus 64B. Instruction data—block A bus 64A and instruction data—block B bus 64B comprise instruction data bus 64 as shown in FIG. 3. Each eight byte portion and the corresponding instruction identifiers form an instruction block.

Byte queue 54 receives the instruction blocks conveyed and stores each received instruction block into one of multiple subqueues included therein. In the embodiment shown, byte queue 54 includes three subqueues: a first subqueue 66A, a second subqueue 66B, and a third subqueue 66C. First subqueue 66A stores the instruction block which is foremost among the instruction blocks stored in byte queue 54 in program order. Second subqueue 66B stores the instruction block which is second in program order, and third subqueue stores the instruction block which is third in program order.

If a particular eight byte portion as scanned by instruction scanning unit 52 includes more than the maximum number of instructions per block, then the particular eight byte portion is retained by instruction scanning unit 52. During the following clock cycle, the particular eight byte portion is scanned again. The predecode data corresponding to the previously identified instructions included within the previously dispatched instruction block is invalidated such that instruction scanning unit 52 detects the additional instructions. If the other eight byte portion concurrently received with the particular eight byte portion is subsequent to the particular eight byte portion in program order, then the other eight byte portion is rescanned as well. Byte queue 54 discards the instruction block received from the other eight byte portion, in order to retain program order among the instruction blocks stored in the byte queue.

Selection control unit 56 conveys a byte queue status upon byte queue status bus 68 to instruction scanning unit 52. Byte queue status bus 68 includes a signal corresponding to each subqueue 66 The signal is asserted if the subqueue 66 is storing an instruction block, and deasserted if the subqueue 66 is not storing an instruction block. In this manner, instruction scanning unit 52 may determine how many instruction blocks are accepted by byte queue 54 during a clock cycle. If two instruction blocks are conveyed during a clock cycle and only one instruction block is accepted, instruction scanning unit 52 retains the rejected instruction block and rescans the instruction block in the subsequent clock cycle.

As noted above, an instruction block may contain up to a maximum number of instructions (e.g. three in the present embodiment). Additionally, eight contiguous bytes are conveyed for each instruction block. However, due to the variable byte length of the x86 instructions, an instruction may begin within one set of eight contiguous bytes and end in another set of eight contiguous bytes. Such an instruction is referred to as an overflow instruction. If an overflow instruction is detected, it is identified as the last of the maximum number of instructions. Instead of being indicated as a valid instruction within the instruction block, the overflow instruction is identified as an overflow. An instruction identifier is generated, but the instruction is handled somewhat differently, as will be explained in more detail below.

In one embodiment, the instruction identifier for each instruction includes: (i) start and end pointers identifying the bytes at which the identified instruction begins and ends within the instruction block; (ii) a valid mask including a bit for each of the bytes within the instruction block; (iii) a bit indicative of whether the instruction is MROM or fast path; (iv) an instruction valid bit indicating that the instruction is valid; and (v) an overflow bit for the last instruction indicating whether or not it is an overflow. The valid mask includes a binary one bit corresponding to each byte included within the particular instruction (i.e. the bits between the start pointer and end pointer, inclusive, are set). Zero bits are included for the other bytes. As used herein, an instruction identifier is a value which identifies one instruction within an instruction block (or blocks, for the overflow case).

Additional information conveyed with the instruction identifiers includes the taken/not taken prediction if the instruction is a branch instruction, bits indicating which of the quarters of the 32 byte cache line the eight bytes correspond to, the functional bits from the predecode data corresponding to the eight bytes, and a segment limit identifying the segment limit within the eight bytes for exception handling. The additional information is provided by instruction cache storage and control block 50 except for the branch prediction, which is provided by branch prediction unit 14.

Selection control unit 56 examines the instruction identifiers stored in byte queue 54 to select instructions from byte queue 54. If less than the maximum number of concurrently dispatchable instructions are selected, then selection control unit 56 redistributes the instructions among the issue positions to substantially equalize the number of instructions conveyed to each issue position, as described in more detail below.

It is noted that MROM instructions are identified by instruction scanning unit 52 as well. Instruction scanning unit 52 routes the MROM instructions to MROM unit 34 (not shown). However, the MROM instructions may flow through instruction alignment unit 18 as well. In this manner, instruction alignment unit 18 may detect the MROM instruction and convey it to decode units 20. MROM unit 34 may then insert the corresponding instructions between early decode units 40 and opcode decode units 44 when the MROM instruction arrives in early decode units 40, as described above with respect to FIG. 2.

A control unit 70 is included within byte queue 54 as well. Control unit 70, upon an indication that all instructions within a given instruction block have been dispatched to decode units 20, shifts the contents of each subqueue 66B–66C into an adjacent subqueue 66A–66B. In this manner, the instruction block which has been exhausted of instructions is discarded and other instruction blocks are maintained in program order. Control unit 70 further allocates subqueues 66 for storing instruction blocks provided by instruction scanning unit 52.

Figure 4:
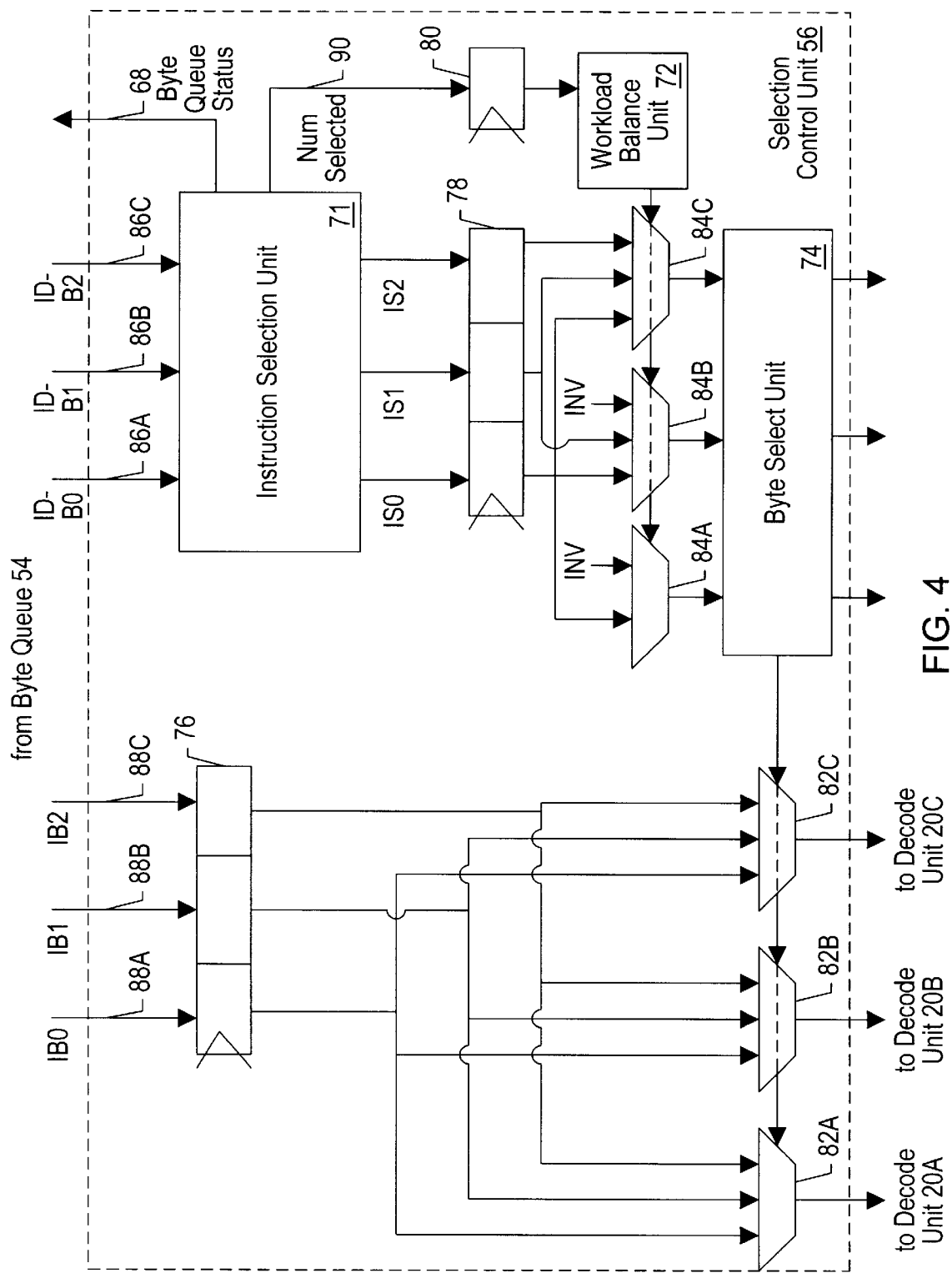
FIG. 4 is a block diagram of one embodiment of a selection control unit illustrated in FIG. 3.

Turning next to FIG. 4, a block diagram of one embodiment of selection control unit 56 is shown. Other embodiments are possible and contemplated. As shown in FIG. 4, selection control unit 56 includes an instruction selection unit 71, a workload balance unit 72, a byte select unit 74, storage devices 76, 78, and 80, and multiplexors 82A–82C and 84A–84C. Instruction selection unit 71 is coupled to receive instruction identifiers corresponding to each instruction block stored in byte queue 54 via instruction identifier buses 86A–86C. Corresponding instruction bytes are provided to storage device 76 on instruction bytes buses 88A–88C. The instruction identifiers ID–B0 on instruction identifiers bus 86A are the instruction identifiers stored in subqueue 66A. Similarly, the instruction identifiers ID-B1 on instruction identifiers bus 86B are the instruction identifiers stored in subqueue 66B and the instruction identifiers ID-B2 on instruction identifiers bus 86C are the instruction identifiers stored in subqueue 66C. The instruction bytes IB0 on instruction bytes bus 88A are the instruction bytes stored in subqueue 66A. Similarly, the instruction bytes IB1 on instruction bytes bus 88B are the instruction bytes stored in subqueue 66B and the instruction bytes IB2 on instruction bytes bus 88C are the instruction bytes stored in subqueue 66C. Each set of instruction bytes IB0–IB2 is conveyed from storage device 76 to muxes 82A–82C. Each of muxes 82A–82C selects instruction bytes for conveyance to a corresponding decode unit 20A–20C. Muxes 82A–82C are coupled to receive selection controls from byte select unit 74, which is coupled to muxes 84A–84C. Instruction selection unit 71 provides selected instruction identifiers IS0–IS2 to storage device 78, which conveys selected instruction identifiers IS0–IS2 to muxes 84A–84C. Particularly, muxes 84A–84C each receive identifier IS0. Muxes 84B–84C each receive identifier IS1, and mux 84C receives identifier IS2. Muxes 84A–84B also receive an invalid instruction identifier (i.e. an instruction identifier indicating that no instruction is being conveyed). Muxes 84A–84C receive selection controls from workload balance unit 72. Workload balance unit 72 is coupled to storage device 80, which is coupled to a num-selected bus 90 from instruction selection unit 71. Instruction selection unit 71 is further configured to provide byte queue status on byte queue status bus 68 response to the instructions selected for dispatch. Instruction selection unit 71 also communicates with control unit 70 (shown in FIG. 3) to cause byte queue 54 to update in response to the instructions selected for dispatch.

Instruction selection unit 71 selects up to the maximum number of concurrently dispatchable instructions (in the present embodiment, up to 3 instructions, or the number of issue positions included in microprocessor 10) and provides instruction identifiers for the selected instructions as identifiers IS0–IS2. Identifier IS0 corresponds to the instruction which is foremost, in program order, among the instructions corresponding to identifiers IS0–IS2. IS1 corresponds to the instruction which is next in program order, and IS2 corresponds to the instruction which is last in program order. If at least one instruction is selected, identifier IS0 identifies an instruction. If two or more instructions are selected, identifier IS1 identifies an instruction, and if three instructions are selected, identifier IS2 identifies an instruction.

Instruction selection unit 71 applies dispatch criteria in selecting instructions for dispatch, and the dispatch criteria may lead to less than the maximum number of concurrently dispatchable instructions being selected. Additionally, if less than the maximum number of concurrently dispatchable instructions is stored in byte queue 54, fewer than the maximum number of concurrently dispatchable instructions may be selected. Generally, dispatch criteria are determined such that any group of instructions selected for concurrent dispatch using the dispatch criteria can be concurrently handled by the hardware employed by the issue positions, reorder buffer 32, etc. According to one embodiment, the following dispatch criteria are used:

(i) instructions are dispatched in program order;

(ii) up to three fast path instructions can be concurrently dispatched;

(iii) an MROM instruction can be dispatched if a synchronization signal (not shown) from MROM unit 34 is asserted indicating that MROM unit 34 is ready to dispatch an MROM instruction;

(iv) an MROM instruction being dispatched to decode unit 20A may concurrently be dispatched with a fast path instruction to decode position 20C and a fast path instruction being dispatched to decode unit 20A may concurrently be dispatched with an MROM instruction to decode position 20B (referred to as "packing"—in which a fast path and an MROM instruction are concurrently dispatched with the speculation that the MROM unit 34 requires only two instructions to perform the function of the MROM instruction. If the speculation is incorrect, the second packed instruction may be redispatched);

(v) at most one MROM instruction is dispatched concurrently;

(vi) an MROM instruction is not dispatched to decode unit 20C (a corollary to criterion (iv));

(vii) at most one predicted taken branch is concurrently dispatched; and (viii) instructions from at most two cache lines are concurrently dispatched (each cache line is represented by an address in reorder buffer 32, and reorder buffer 32 employs two locations for storing addresses for each set of concurrently dispatched instructions in the present embodiment).

Instruction selection unit 71 assigns instructions to preliminary issue positions represented by identifiers IS0–IS2. Identifier IS0 is assigned to the first preliminary issue position, identifier IS1 is assigned to the second preliminary issue position, etc. When three instructions (for the present embodiment) are selected for concurrent dispatch, each of the preliminary issue positions is filled. Since each issue position receives an instruction, the workload distribution among the issue positions is balanced. On the other hand, if only one or two instructions are selected, only the first or first and second preliminary issue positions are assigned instructions. The first and second preliminary issue positions may thereby receive (over a number of clock cycles) more instructions the third preliminary issue position. Similarly, the first preliminary issue position may receive more instructions (over a number of clock cycles) then the second preliminary issue position due to cases in which only one instruction is selected.

Workload balance unit 72 analyzes the preliminary issue position assignments and reassigns instructions to different issue positions to substantially equalize the workload (i.e. the number of instructions dispatched) among the issue positions. For example, if only one instruction is selected for dispatch, the instruction may be reassigned from the first issue position to the second or third issue position. If two instructions are selected for dispatch, the two instructions may be assigned to the second and third issue positions, or to the first and third issue positions.

According to one embodiment, reorder buffer 32 (and other hardware within the issue positions) relies on the instruction in the first issue position to be prior to, in program order, instructions concurrently transmitted to the other issue positions. Similarly, the instruction in the second issue position is to be subsequent to the instruction in the first issue position (if any) and prior to the instruction in the third issue position. Accordingly, instructions may be assigned to the preliminary issue position or to a next consecutive issue position. As used herein, a "next consecutive issue position" is an issue position which, relative to a particular issue position, is defined to receive an instruction which succeeds the instruction in the particular issue position in program order may also be reassigned from a particular issue position to any issue position defined to receive an instruction subsequent to the instruction within the particular issue position in program order. For example, an instruction from the first issue position may be reassigned to the third issue position. Accordingly, the valid instructions which are concurrently dispatched remain in program order even if the first issue position or the second issue position is not issued an instruction during a particular clock cycle.

Workload balance unit 72 receives the number of instruction selected from instruction selection unit 71 through storage device 80, and generates selection controls for muxes 84A–84C in order to accomplish reassignment of instructions from preliminary issue positions to final issue positions. The instruction identifiers IS0–IS2, rearranged into the final issue positions represented by the output of muxes 84A–84C, are then received by byte select unit 74. Byte select unit 74 uses the information within the instruction identifiers to select bytes from instruction bytes IB0–IB2 for conveyance to each decode unit 20A–20C. The instruction identifier received from mux 84A (if any) determines which bytes are selected by mux 82A for conveyance to decode unit 20A. Similarly, the instruction identifier received from mux 84B (if any) determines which bytes are selected by mux 82B for conveyance to decode unit 20B and the instruction identifier received from mux 84C (if any) determines which bytes are selected by mux 82C for conveyance to decode unit 20C. Byte select unit 74 may also convey a portion or all of each instruction identifier to decode units 20A–20C if decode units 20A–20C use a portion or all of the information included therein.

It is noted that, through storage devices 76, 78, and 80 (which may be, e.g., registers), selection control unit 56 divides instruction selection from byte queue 54 and workload balancing and instruction byte selection into two pipeline stages operable upon a group of selected instructions during different clock cycles. However, other embodiments may perform these functions in a single clock cycle. Additionally, workload balance unit 72 may be operable during the same clock cycle as instruction selection from byte queue 54, with byte selection following in the succeeding clock cycle. Generally, workload balancing may be performed at any suitable point in the instruction processing pipeline of microprocessor 10. Preferably, workload balancing is performed prior to instructions being presented to reorder buffer 32. Workload balance unit 72 may be integrated with instruction selection unit 71 or other logic, as desired.

Figure 5:
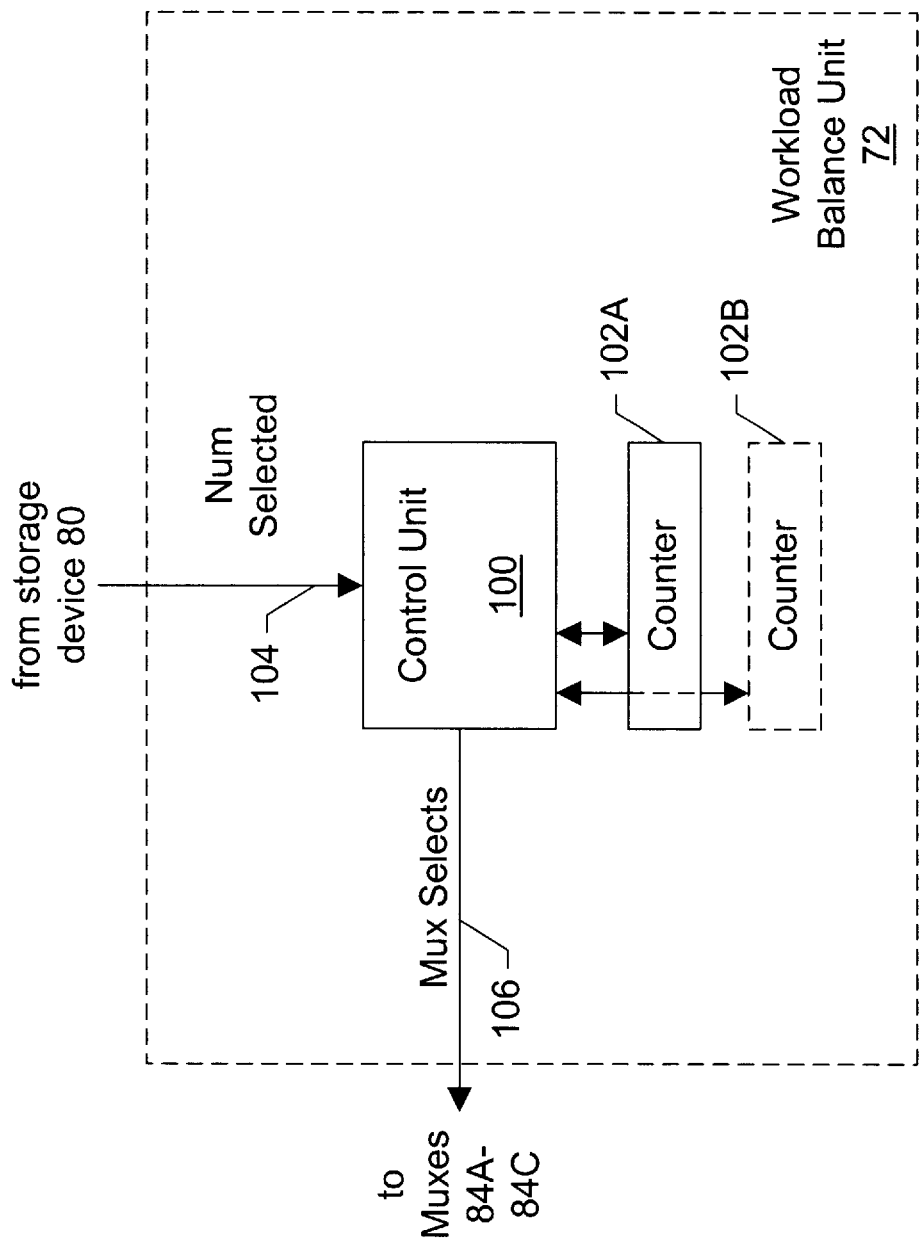
FIG. 5 is a block diagram of one embodiment of a workload balance unit shown in FIG. 4.

Turning next to FIG. 5, a block diagram of one embodiment of workload balance unit 72 is shown. Other embodiments are possible and contemplated. As shown in FIG. 5, workload balance unit 72 includes a control unit 100 coupled to one or more counters 102A–102B. Control unit 100 is further coupled to a bus 104 for receiving the number of instructions selected (num-selected) from storage device 80 (or instruction selection unit 71, depending upon the embodiment). Moreover, control unit 100 is coupled to a set of mux select lines 106 to muxes 84A–84B.

Control unit 100 receives the number of instructions selected upon bus 104. If the number of instructions selected is at least one and less than the maximum number of concurrently dispatchable instructions, control unit 100 uses the counter value to determine which issue positions are to receive the instructions. Each counter value corresponds to a different reassignment of issue positions, and the counters may be configured to increment through a number of counter values equal to the number of possible issue position reassignments and then reset to a first counter value. For example, in one embodiment there are three possible issue position reassignments (as shown in FIG. 6 below). Therefore, the counter values may increment from 0 to 1 to 2 and reset to 0 as issue position reassignments are performed.

Upon generating mux selects upon lines 106, control unit 100 may increment the counter to cause a different selection of issue positions the next time that at least one and less than the maximum number of concurrently dispatchable instructions are selected. If zero instructions are selected or the maximum number of concurrently dispatchable instructions are selected, then control unit 100 does not reassign issue positions and the counter value is not incremented.

Workload balance unit 72 may implement one counter 102A for use with any number of selected instructions between one and one less than the maximum. Optionally, additional counters such as counter 102B may be implemented. When multiple counters 102A–102B are employed, one of the counters may be used for each different number of selected instructions. For example, workload balance unit 72 reassigns issue positions in the present embodiment if one or two instructions are selected. Counter 102A may be used if one instruction is selected, and counter 102B may be used if two instructions are selected. The counter 102A–102B used to determine issue position reassignment is incremented and the counter 102A–102B not used to determine issue position reassignment is held constant. Using multiple counters may lead to an even more even distribution than if only a single counter is used.

In an alternative embodiment, workload balance unit 72 receives feedback from reservation stations 22A–22C to determine which issue positions are to receive instructions when at least one and less than the maximum number of concurrently dispatchable instructions are selected. Each reservation station 22A–22C indicates the number of instructions stored therein, and workload balance unit 72 reassigns instructions to the issue positions including the least-full reservation stations 22A–22C. Counters may be used to indicate which reservation station(s) to select if two or more reservation stations are determined to be "least-full" according to the feedback information. Such an alternative evens the distribution based upon reservation station fullness, as opposed to the total number of instructions dispatched to each issue position. Accordingly, factors such as instruction dependencies and resource conflicts (which may cause reservation stations receiving the same total number of instructions to be more full or less full than one another) may be accounted for by employing such an alternative. In yet another alternative, additional counters may be employed by workload balance unit 72 to count the number of instructions in intermediate pipeline stages between instruction alignment unit 18 and reservation stations 22A–22C. These additional counters, in combination with the reservation station counts may be used to generate an even more accurate count of instructions within each issue position.

It is noted that workload balance unit 72 may be configured to operate upon double dispatch instructions in the embodiment illustrated in FIG. 2. Double dispatch instructions are treated as two instructions by workload balance unit 72.

FIG. 6 is a truth table 110 illustrating operation of one particular embodiment of workload balance unit 72. Each row of truth table 110 illustrates a number of instructions selected and the corresponding counter value, and the instructions in the resulting issue positions after reassignment by workload balance unit 72. Issue position 0 may correspond to decode unit 20A, reservation station 22A, and functional unit 24A. Similarly, issue position 1 may correspond to decode unit 20B, reservation station 22B, and functional unit 24B. Finally, issue position 2 may correspond to decode unit 20C, reservation station 22C, and functional unit 24C. For embodiments of workload balance unit 72 employing multiple counters, the counter value in the counter value column of truth table 110 refers to the counter value within the counter corresponding to the number of instructions selected.

Figure 7:
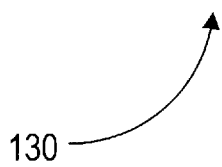
FIG. 7 is a block diagram of one embodiment of an instruction identifier.

Turning now to FIG. 7, a diagram is shown depicting an exemplary instruction identifier 130 which may be stored in subqueues 66A–66C, according to one embodiment. For example, instruction identifier 130 may identify the first, second, or third instruction within an instruction block. Instruction identifier 130 stores a valid indication 132, a start pointer 134, an end pointer 136, a valid mask 138, an MROM/fast path indication 140, and a branch prediction indication 142.

Valid indication 132 identifies the validity or invalidity of the remainder of instruction identifier 130. In one embodiment, valid indication 132 comprises a bit indicative, when set, that instruction identifier 130 is valid. When clear, the bit indicates that instruction identifier 130 is invalid.

Start pointer 134 and end pointer 136 locate the byte positions within the instruction block at which the corresponding instruction begins and ends, respectively. For embodiments in which an instruction block includes 8 bytes, start pointer 134 and end pointer 136 each comprise three bit values indicating the numerical position between zero and seven of the respective start or end point. Valid mask 138 is a mask of zeros and ones. Each bit in the mask corresponds to one of the bytes within the instruction block. Bits in the mask corresponding to bytes not included within the corresponding instruction are set to zero. Conversely, bits in the mask corresponding to bytes included within the instruction are set to one. For example, if the corresponding instruction begins at the third byte within the instruction block and ends at the fifth byte within the instruction block, the start pointer is 010, the end pointer is 100, and the mask is 00111000 (all expressed in binary format). The start pointer, end pointer, and mask are used by byte select unit 74 to generate selection controls for selecting bytes within the instruction block when the instruction is selected for issue.

MROM/fast path indication 140 indicates the MROM or fast path nature of the corresponding instruction. In one embodiment, indication 140 comprises a bit indicative, when set, that the instruction is an MROM instruction. When clear, the bit indicates that the instruction is a fast past instruction. Finally, branch prediction indication 142 comprises a bit indicative, when set, that the instruction is a branch instruction which is predicted taken. When clear, the bit indicates that the instruction is either not a branch instruction or is a branch instruction predicted not taken.

Figure 8:
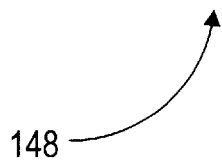
FIG. 8 is a block diagram of one embodiment of instruction information shared among the instructions within and instruction block.

Turning now to FIG. 8, a diagram is shown depicting exemplary information stored in a shared field 148 of a subqueue 66A–66C. Information stored in shared field 148 is shared information valid for the entire instruction block, according to one embodiment. An address bits field 150, a functional bits field 152, a segment limit field 154, an overflow indication 156, and an instruction bytes field 158 are included. Address bits field 150 stores a pair of address bits which identify the quarter of the cache line from which the instruction block was fetched. Functional bits field 152 stores the original functional bits from the predecode data associated with the instruction bytes within the instruction block.

Segment limit field 154 is used to detect instructions being dispatched from outside the code segment. As will be appreciated by those skilled in the art, the x86 microprocessor architecture divides the memory space into segments. One of these segments is the code segment, from which instructions are fetched. The segment has a defined limit, which may be of arbitrary size. If instruction execution proceeds outside of the code segment, a segment limit violation exception is signalled. Microprocessor 10 may handle segment limit violations as follows: if an entire set of instructions fetched from instruction cache 16 during a clock cycle lies outside the code segment, the instructions are not conveyed to instruction alignment unit 18. Instead, the segment limit violation is signalled to reorder buffer 32. If instructions prior to the segment limit violation retire successfully (as opposed to being discarded due to branch misprediction or other exception), then the exception may be taken at that time. However, the limit may be arbitrary and therefore may fall within the set of instructions fetched from instruction cache 16. Segment limit field 154 is included for handling this case. If the limit is crossed within the instruction block, then segment limit field 154 indicates which byte position represents the segment limit. In one embodiment, segment limit field 154 comprises three bits to indicate a limit at one of the eight bytes within the instruction block. If an instruction beyond the limit imposed by segment limit field 154 is dispatched, an exception is signalled to reorder buffer 32.

Overflow indication 156 indicates that one of the instructions within the instruction block overflows into the subsequent instruction block. Information regarding the overflowing instruction is stored in position I2 (see FIG. 9 below) of the corresponding subqueue 66A–66C. In one embodiment, overflow indication 156 comprises a bit indicative, when set, that an instruction within the instruction block overflows. When clear, the bit indicates that no instruction within the instruction block overflows. If overflow indication 156 is set, then the valid indication within position I2 is clear. Alternatively, overflow indication 156 is clear if the valid indication within position I2 is set. In this manner, position I2 is indicated either to store an overflow instruction or a valid instruction ending within the instruction block, but not both. Additionally, position I2 is indicated to be not storing an instruction if both overflow indication 156 and the valid indication for position I2 are clear. Instruction bytes field 158 stores the actual instruction bytes included within the instruction block. In one embodiment, instruction bytes field 158 is eight bytes wide.

Figure 9:
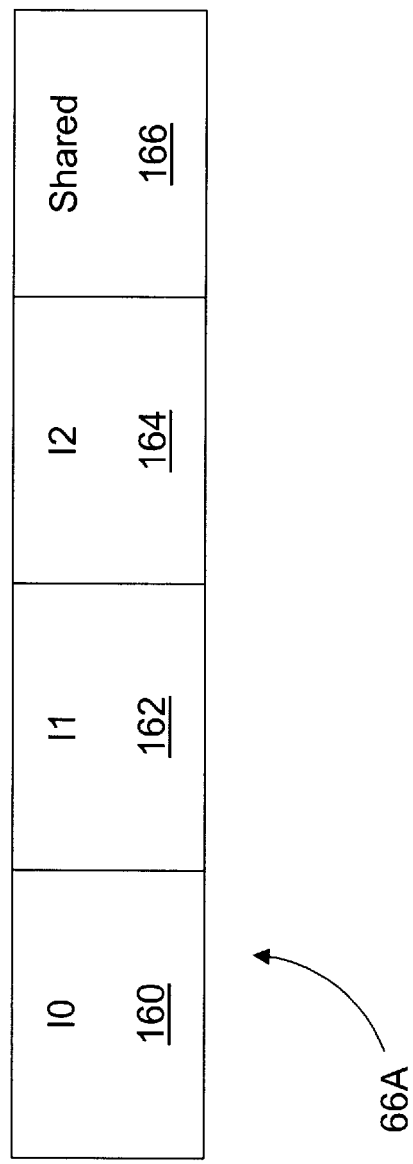
FIG. 9 is a block diagram of one embodiment of a subqueue shown in FIG. 3.

Turning now to FIG. 9, a diagram of one embodiment of subqueue 66A is shown. Other embodiments are possible and contemplated. Subqueues 66B–66C may be similar. FIG. 9 illustrates the fields within subqueue 66A used to store instruction information. As shown in FIG. 9, subqueue 66A includes a first instruction position 160, a second instruction position 162, a third instruction position 164, and a shared field 166. Instruction positions 160, 162, and 164 store instruction identifiers (for example instruction identifier 130 as shown in FIG. 7). First instruction position 160 identifies the instruction which is first within the instruction block stored in subqueue 66A in program order. Second instruction position 162 identifies the instruction which is second within the instruction block stored in subqueue 66A in program order. Third instruction position 164 identifies the instruction which is third in program order within the instruction block. Shared field 166 stores information as shown in shared field 148 in FIG. 8.

Figure 10:
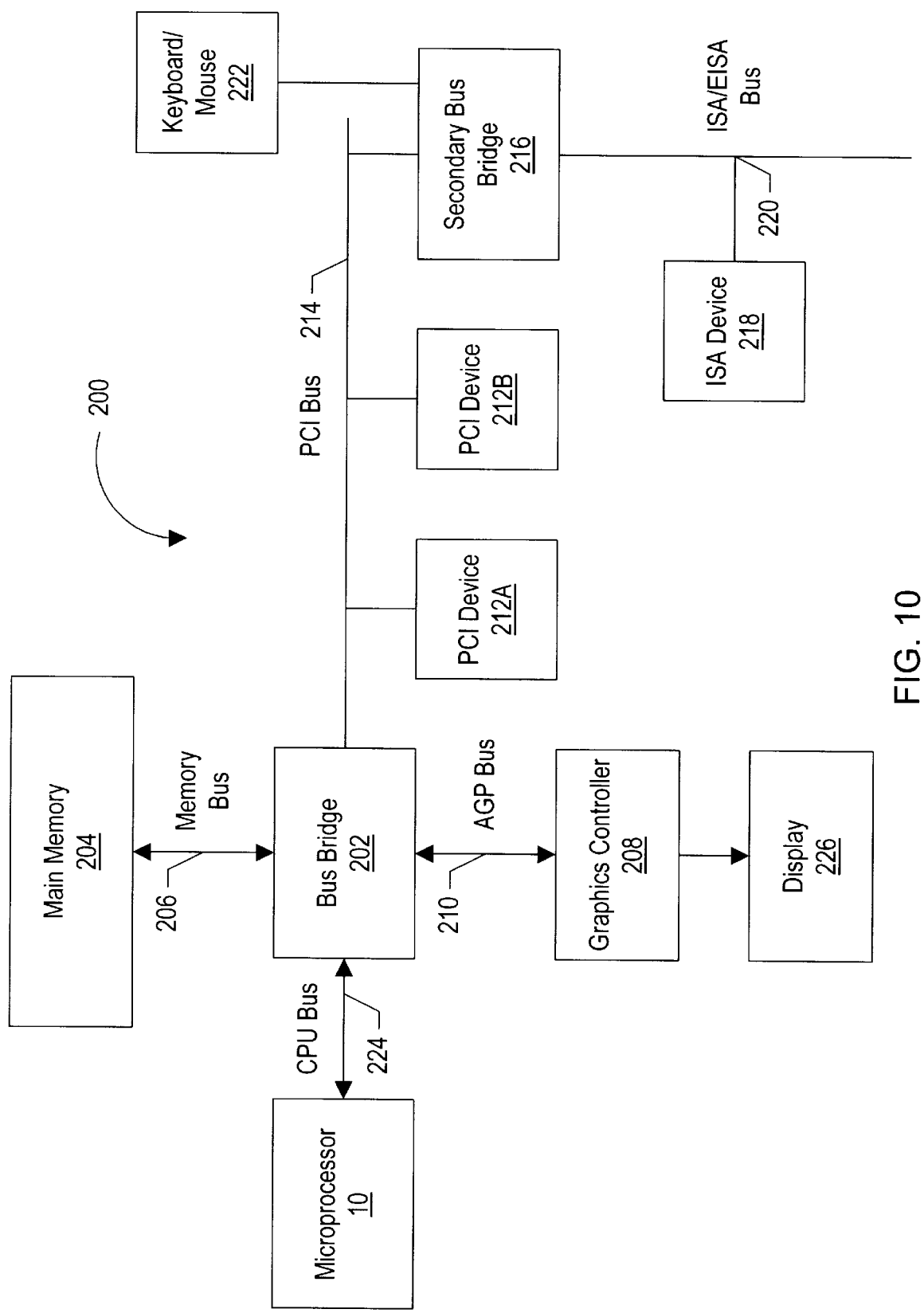
FIG. 10 is a block diagram of one embodiment of a computer system including the microprocessor shown in FIG. 1.

Turning now to FIG. 10, a block diagram of a computer system 200 including microprocessor 10 coupled to a variety of system components through a bus bridge 202 is shown. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Microprocessor 10 is coupled to bus bridge 202 through a CPU bus 224.

In addition to providing an interface to an ISA/EISA bus, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between microprocessor 10 and bus bridge 202 in other embodiments. Alternatively, the external cache may be coupled to bus bridge 202 and cache control logic for the external cache may be integrated.

Main memory 204 is a memory in which application programs are stored and from which microprocessor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bridge logic unit 102 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 302 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well.

Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |

TABLE 1-continued x86 Fast Path, Double Dispatch, and MROM Instructions

| X86 Instruction | Instruction Category |
|---|---|
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |

TABLE 1-continued x86 Fast Path, Double Dispatch, and MROM Instructions

| X86 Instruction | Instruction Category |
|---|---|
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

Note:
Instructions including an SIB byte are also considered double dispatch instructions.

In accordance with the above disclosure, a microprocessor has been shown which employs workload balancing to distribute instructions to a set of symmetrical functional units in a substantially equal fashion. Advantageously, each functional unit may include a similar amount of resources and, due to the even distribution of instructions, may achieve reduced stalling even though less than the maximum number of concurrently dispatchable instructions may be detected over a set of clock cycles.

Numerous variations and modifications will become apparent to those skilled in the art once the above disclosure is fully appreciated. It is intended that the following claims be interpreted to embrace all such variations and modifications.

What is claimed is:

1. An instruction alignment unit comprising:
   an instruction selection unit configured to receive a plurality of instruction identifiers which locate instructions within a plurality of instruction bytes, said instruction selection unit configured to select up to a maximum number of instructions for dispatch during a clock cycle responsive to said plurality of instruction identifiers, and wherein said instruction selection unit is configured to assign each selected instruction to a preliminary one of a plurality of issue positions responsive to a program order of said selected instructions; and
   a workload balance unit coupled to said instruction selection unit, wherein said workload balance unit is configured to reassign said each selected instruction from said preliminary one of said plurality of issue positions to a final one of said plurality of issue positions responsive to a number of said selected instructions being less than said maximum number of instructions.

2. The instruction alignment unit as recited in claim 1 wherein said workload balance unit comprises a counter, and wherein said workload balance unit is configured to use a value of said counter to determine said final one of said plurality of issue positions.

3. The instruction alignment unit as recited in claim 2 wherein, responsive to a first value of said counter, said workload balance unit assigns said final one of said plurality of issue positions to be said preliminary one of said plurality of issue positions.

4. The instruction alignment unit as recited in claim 2 wherein, responsive to a second value of said counter, said workload balance unit assigns said final one of said plurality of issue positions to be a next consecutive one of said plurality of issue positions to said preliminary one of said plurality of issue positions.

5. The instruction alignment unit as recited in claim 2 wherein, responsive to a third value of said counter, said workload balance unit assigns said final one of said plurality of issue positions to be said preliminary one of said plurality of issue positions for one of said selected instructions and assigns said final one of said plurality of issue positions to be a next consecutive one of said plurality of issue positions to said preliminary one of said plurality of issue positions for another one of said selected instructions.

6. The instruction alignment unit as recited in claim 2 wherein said workload balance unit is configured to increment said counter upon said number of said selected instructions being less than said maximum number of instructions.

7. The instruction alignment unit as recited in claim 2 further comprising a plurality of counters, wherein each counter corresponds to a different number of said selected instructions, said different number being less than said maximum number of instructions.

8. The instruction alignment unit as recited in claim 1 wherein said workload balance unit is coupled to receives said number of selected instructions from said instruction selection unit.

9. The instruction alignment unit as recited in claim 1 wherein each of said plurality of issue positions comprises a decode unit configured to decode an instruction provided thereto by said instruction alignment unit.

10. The instruction alignment unit as recited in claim 9 wherein said each of said plurality of issue positions further comprises a functional unit coupled to said decode unit, wherein said functional unit is configured to execute said instruction.

11. The instruction alignment unit as recited in claim 10 wherein said functional unit include within said each of said plurality of issue positions is symmetrical with said functional unit within each other one of said plurality of issue positions.

12. A method for aligning instructions to a plurality of issue positions comprising:
   identifying up to a maximum number of instructions for dispatch during a clock cycle; and
   distributing, if less than said maximum number of instructions are identified during said identifying, instructions to said plurality of issue positions using a distribution which substantially equalizes a number of instructions conveyed to each of said plurality of issue positions over a plurality of clock cycles.

13. The method as recited in claim 12, wherein said distributing comprises:

assigning each instruction identified during said identifying to a preliminary one of said plurality of issue positions responsive to a program order of said instructions; and reassigning said each instruction identified during said identifying to a final one of said plurality of issue positions responsive to a number of said instructions being less than said maximum number of instructions.

14. The method as recited in claim 13 wherein a first one of said plurality of issue positions is configured to receive a first one of said instructions, said first one of said instructions being prior to each other one of said instructions in program order, and wherein a second of said plurality of issue positions is configured to receive a second one of said instructions, said second one of said instructions being subsequent to said first one of said instructions in program order and prior to each other one of said instructions in program order.

15. The method as recited in claim 14 wherein said reassigning comprises assigning said first one of said instructions to said second one of said plurality of issue positions and assigning no instruction to said first one of said plurality of issue positions.

16. The method as recited in claim 15 wherein said reassigning further comprises assigning said second one of said instructions to a third one of said plurality of issue positions.

17. The method as recited in claim 14 wherein said reassigning comprises assigning said first one of said instructions to said first one of said plurality of issue positions and said second one of said instruction to a third one of said plurality of issue positions.

18. The method as recited in claim 13 wherein said reassigning comprises:

maintaining a counter value; and selecting said final one of said plurality of issue positions responsive to said counter value.

19. The method as recited in claim 18 further comprising incrementing said counter value upon said number of said instructions being less than said maximum number of instructions.

20. A microprocessor comprising:

a plurality of issue positions, wherein an instruction provided to one of said plurality of issue positions is decoded by a decode unit comprising said one of said plurality of issue positions and is executed by a functional unit comprising said one of said plurality of issue positions; and an instruction alignment unit configured to select an instruction for each of said plurality of issue positions, and, if fewer instructions are selected during a clock cycle than a number of said plurality of issue positions, said instruction alignment unit is configured to distribute said instructions to said plurality of issue positions to substantially equalize a number of instructions dispatched to each one of said plurality of issue positions during a number of clock cycles.

21. The microprocessor as recited in claim 20 wherein said instruction alignment unit is configured to maintain a counter, and wherein each value of said counter causes said instruction alignment unit to distribute said instructions to said plurality of issue positions in a different manner.

22. The microprocessor as recited in claim 21, wherein said instruction alignment unit is configured to increment said counter each time fewer instructions are selected during a clock cycle than said number of said plurality of issue positions.

23. The microprocessor as recited in claim 22 wherein said instruction alignment unit comprises multiple counters, and wherein each one of said multiple counters corresponds to a different number of selected instructions fewer than said number of said plurality of issue positions.

24. The microprocessor as recited in claim 23 wherein said instruction alignment unit is configured to increment said one of said multiple counters corresponding to a particular number of selected instructions during a clock cycle in which said particular number are selected, after using said one of said multiple counters to dispatch said selected instructions.

25. A computer system comprising:

a microprocessor comprising a plurality of issue positions, wherein an instruction provided to one of said plurality of issue positions is decoded by a decode unit comprising said one of said plurality of issue positions and is executed by a functional unit comprising said one of said plurality of issue positions; said microprocessor further comprising an instruction alignment unit configured to select an instruction for each of said plurality of issue positions, and, if fewer instructions are selected during a clock cycle than a number of said plurality of issue positions, said instruction alignment unit is configured to distribute said instructions to said plurality of issue positions to substantially equalize a number of instructions dispatched to each one of said plurality of issue positions during a number of clock cycles; and an input/output (I/O) device coupled to said microprocessor and to another computer system, wherein said I/O device is configured to communicate between said computer system and said another computer system.

26. The computer system as recited in claim 25 wherein said instruction alignment unit is configured to maintain a counter, and wherein each value of said counter causes said instruction alignment unit to distribute said instructions to said plurality of issue positions in a different manner.

27. The computer system as recited in claim 26, wherein said instruction alignment unit is configured to increment said counter each time fewer instructions are selected during a clock cycle than said number of said plurality of issue positions.

28. The computer system as recited in claim 27 wherein said instruction alignment unit comprises multiple counters, and wherein each one of said multiple counters corresponds to a different number of selected instructions fewer than said number of said plurality of issue positions.

29. The computer system as recited in claim 28 wherein said instruction alignment unit is configured to increment said one of said multiple counters corresponding to a particular number of selected instructions during a clock cycle in which said particular number are selected, after using said one of said multiple counters to dispatch said selected instructions.

30. The computer system as recited in claim 25 wherein said I/O device comprises a modem.

31. The computer system as recited in claim 25 wherein said I/O device comprises a network interface card.

* * * * *